United States Patent
Matthews et al.

(10) Patent No.: US 9,849,961 B2
(45) Date of Patent: Dec. 26, 2017

(54) HIGH ALTITUDE BALLOON WITH A PAYLOAD SEPARATION ASSEMBLY

(71) Applicant: NORTHROP GRUMMAN SYSTEMS CORPORATION, Falls Church, VA (US)

(72) Inventors: Taylor Evan Matthews, San Diego, CA (US); Anthony Paul Fry, San Diego, CA (US); Jessica Marie Lavigne, San Diego, CA (US); Rafy Uddin Athar, San Diego, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 56 days.

(21) Appl. No.: 14/862,433

(22) Filed: Sep. 23, 2015

(65) Prior Publication Data
US 2017/0081011 A1    Mar. 23, 2017

(51) Int. Cl.
*B64B 1/40* (2006.01)
*B64D 1/02* (2006.01)
*B64D 47/08* (2006.01)

(52) U.S. Cl.
CPC .............. *B64B 1/40* (2013.01); *B64D 1/02* (2013.01); *B64D 47/08* (2013.01)

(58) Field of Classification Search
CPC .... B64B 1/40; B64B 1/62; B64B 1/70; B64B 1/14; B64B 1/50; B64B 1/32; B64D 1/02; B64D 1/22; B64D 47/08; B64D 1/12; B64D 1/16; B64D 17/22; B64D 17/62
See application file for complete search history.

(56) References Cited

U.S. PATENT DOCUMENTS

| 2,990,147 | A | * | 6/1961 | Yost | B64B 1/40 138/93 |
| 3,012,810 | A | * | 12/1961 | Tenney | B64B 1/40 294/82.25 |
| 3,116,037 | A | * | 12/1963 | Yost | B64B 1/40 244/3 |
| 3,130,703 | A | | 4/1964 | Thompson | |
| 3,390,851 | A | * | 7/1968 | Le Vee Mann | B64B 1/64 244/32 |
| 3,432,122 | A | * | 3/1969 | Ross | B64B 1/40 244/31 |
| 3,614,031 | A | * | 10/1971 | Demboski | B64B 1/62 244/138 R |
| 3,686,721 | A | * | 8/1972 | Nelson | B64B 1/60 24/304 |
| 3,773,279 | A | * | 11/1973 | Wright | B64B 1/60 244/31 |
| 4,215,834 | A | * | 8/1980 | Dunlap | B64B 1/62 244/97 |
| 4,262,864 | A | * | 4/1981 | Eshoo | B64B 1/58 126/577 |

(Continued)

OTHER PUBLICATIONS

Hall et al., "Mars Balloon Flight Test Results".*

*Primary Examiner* — Assres H Woldemaryam
(74) *Attorney, Agent, or Firm* — McNair Law Firm, P.A.

(57) ABSTRACT

A high altitude balloon including a payload, a balloon film with lifting gas disposed within the balloon film, a sealing ring operably coupled to the balloon film, a retention element configured to retain the payload in contact with the sealing ring, and a release element configured to cause the retention element to release the payload.

20 Claims, 5 Drawing Sheets

(56) References Cited

U.S. PATENT DOCUMENTS

| | | | | |
|---|---|---|---|---|
| 4,705,235 A * | 11/1987 | Regipa | ................ | B64B 1/58 244/31 |
| 5,149,015 A * | 9/1992 | Davis | ................ | B64B 1/40 244/190 |
| 5,335,689 A * | 8/1994 | Reittu | ................ | G01W 1/08 137/231 |
| 5,548,283 A * | 8/1996 | Martin | ................ | G01W 1/08 244/1 TD |
| 6,648,272 B1 * | 11/2003 | Kothmann | ................ | B64B 1/005 244/30 |
| 7,341,224 B1 * | 3/2008 | Osann, Jr. | ................ | B64C 39/028 244/30 |
| 7,344,267 B2 * | 3/2008 | Carito | ................ | A63H 27/10 362/189 |
| 7,347,147 B2 * | 3/2008 | Bar | ................ | F42B 10/50 102/473 |
| 7,356,390 B2 * | 4/2008 | Knoblach | ................ | B64B 1/40 244/31 |
| 8,998,128 B2 * | 4/2015 | Ratner | ................ | B64B 1/62 244/31 |
| 9,016,634 B1 * | 4/2015 | Ratner | ................ | B64B 1/40 244/137.4 |
| 9,174,738 B1 * | 11/2015 | Roach | ................ | B64D 1/12 |
| 9,463,863 B1 * | 10/2016 | Roach | ................ | B64B 1/58 |
| 9,573,671 B1 * | 2/2017 | Roach | ................ | B64B 1/62 |
| 2003/0062444 A1 * | 4/2003 | Goodey | ................ | B64B 1/00 244/24 |
| 2009/0047864 A1 * | 2/2009 | Burchett | ................ | A63H 27/10 446/224 |
| 2014/0353424 A1 * | 12/2014 | Ratner | ................ | B64B 1/62 244/98 |

* cited by examiner

HIGH ALTITUDE BALLOON WITH A PAYLOAD SEPARATION ASSEMBLY

TECHNICAL FIELD

Example embodiments generally relate to high altitude balloons and, in particular, relate to a high altitude balloon with a payload separation assembly.

BACKGROUND

High altitude systems, such as high altitude balloons may be used for a variety of applications including high altitude scientific experiments, communications, surveillance, or the like. Typical high altitude balloons are capable of altitudes of about 60,000 ft to 120,000 ft. Some high altitude balloons may include a payload, e.g. equipment to perform the desired application, such as environmental sensors, communications transceiver, positioning equipment, surveillance cameras, or the like. In some instances, the payload may be coupled to the high altitude balloon by a cable, suspending the payload below the balloon. In an instance in which the payload is suspended below the balloon, the payload may not have the desired stability for the application.

In some applications, it may be desirable to determine the environmental conditions of a balloon film or a lifting gas of the high altitude balloon. Suspension of the payload below the balloon may prohibit gathering of some environmental data or require additional materials, such as extension wiring, to relay information from an environmental sensor to the payload.

BRIEF SUMMARY OF SOME EXAMPLES

Accordingly, some example embodiments may enable the provision of a high altitude balloon, as described below. In one example embodiment, a high altitude balloon is provided including a payload, a balloon film with lifting gas disposed within the balloon film, a sealing ring operably coupled to the balloon film, a retention element configured to retain the payload in contact with the sealing ring, and a release element configured to cause the retention element to release the payload.

BRIEF DESCRIPTION OF THE SEVERAL VIEWS OF THE DRAWING(S)

Having thus described the high altitude balloon in general terms, reference will now be made to the accompanying drawings, which are not necessarily drawn to scale, and wherein:

DETAILED DESCRIPTION

Figure 1:
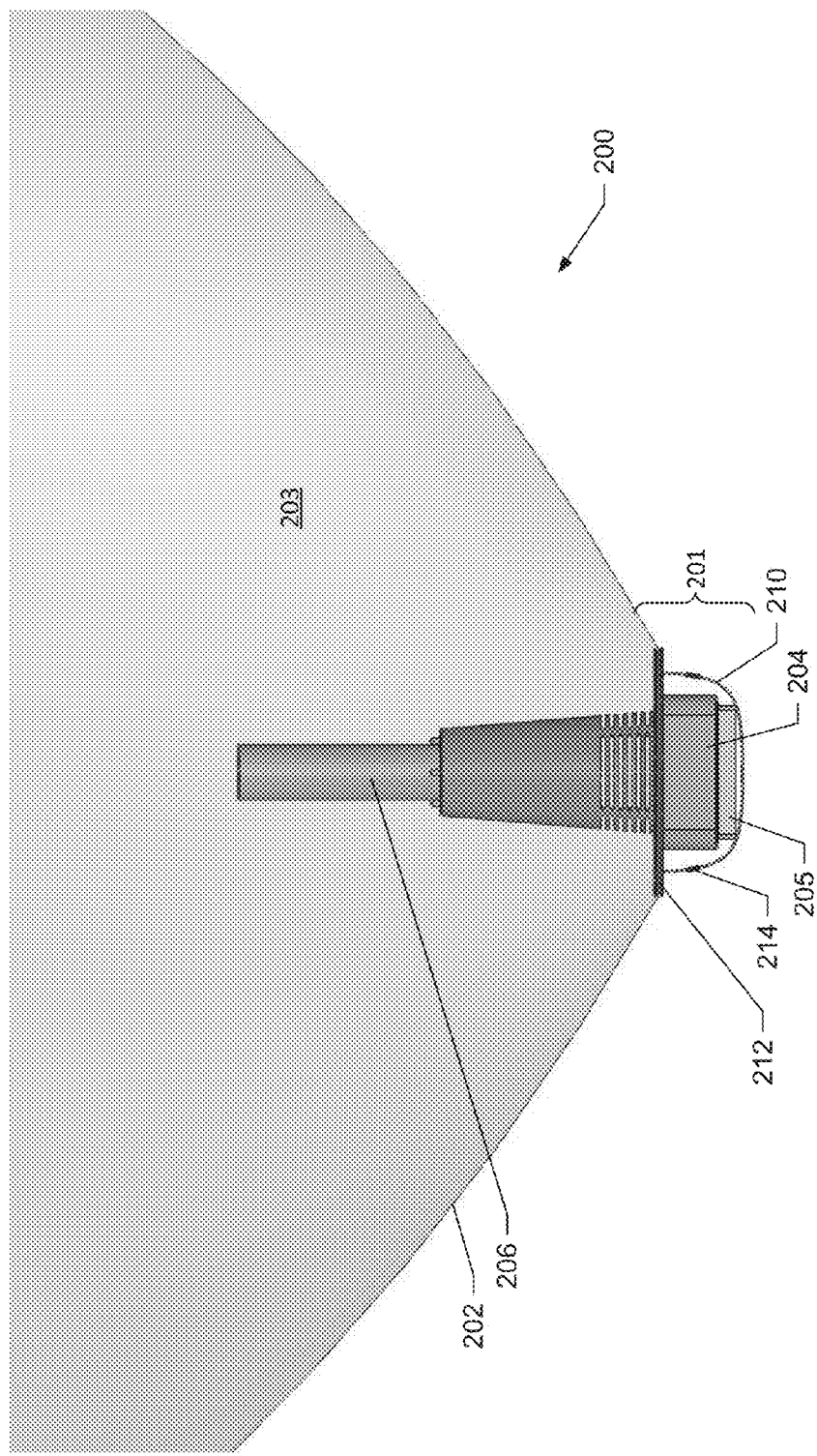
FIG. 1 illustrates a high altitude balloon with a payload separation assembly according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

In some example embodiments, it may be desirable to operably couple the payload to the balloon, such as to increase stability of the payload. A high altitude balloon may include a sealing ring with which a payload may be retained in contact. In some embodiments, the sealing ring may include a payload aperture allowing a portion of the payload to extend into the balloon film. The extension of a portion of the payload into the balloon film may allow for direct monitoring of environmental data within or of the balloon.

In an example embodiment, the payload may be released from the sealing ring by triggering of a release element. The release element may be triggered in response to meeting a predetermined condition, such as time, altitude, geographic position, or the like, or may be triggered remotely. The release of the payload may expose the payload aperture allowing for the lifting gas to escape, causing the high altitude balloon to descend. In some example embodiments, descent of the high altitude balloon may be accelerated and/or the high altitude balloon may be destroyed by removing a tear out patch in the balloon film. A destruct tether may be operably coupled to the payload and tear out patch, such that separation of the payload causes the tear out patch to be removed by the destruct tether.

Example High Altitude Balloon

An example embodiment of the high altitude balloon will now be described in reference to FIG. 1. FIG. 1 illustrates a high altitude balloon 200 with a payload separation assembly 201 according to an example embodiment. The high altitude balloon 200 may include a balloon film 202, a payload 204, and a payload separation assembly 201.

The balloon film 202 may be a thin plastic film, such as polyethylene. The balloon film 202 may have a thickness of about $1/3000^{th}$ to $1/10000^{th}$ of an inch. The balloon film 202 may be filled with a lifting gas 203 and cinched, plugged, tied, or otherwise sealed. The lifting gas 203 may provide positive buoyancy to the high altitude balloon 200. The lifting gas 203 may be any gas which is lighter than air, such as hydrogen, helium, methane, ammonia, or the like. The high altitude balloon 202 may be configured to operate at an altitude of about 60,000 ft to about 120,000 ft. In some embodiments, the high altitude balloon 200 may be configured to operate at altitudes greater-than 120,000 ft or less-than 60,000 ft. The operating altitude may be dependent on the volume of the lifting gas 203, which may in turn be dependent on the volume of the balloon film 202. The volume of the lifting gas 203 may be selected to cause lift sufficient to cause ascension of the high altitude balloon 200 and the payload 204 to the selected altitude.

The payload 204 may be an electronic device including one or more electronic components, such as processors, sensors, antennas, or the like. In an example embodiment, the payload 204 may be communications equipment, navigation equipment, environmental sensors, surveillance systems, weapons systems, or the like. The payload 204 may be operably coupled to the balloon film 202 through the payload separation assembly 201. The payload separation assembly 201 may include a sealing ring 212, a retention element 210, and a release element 214.

Figure 2:
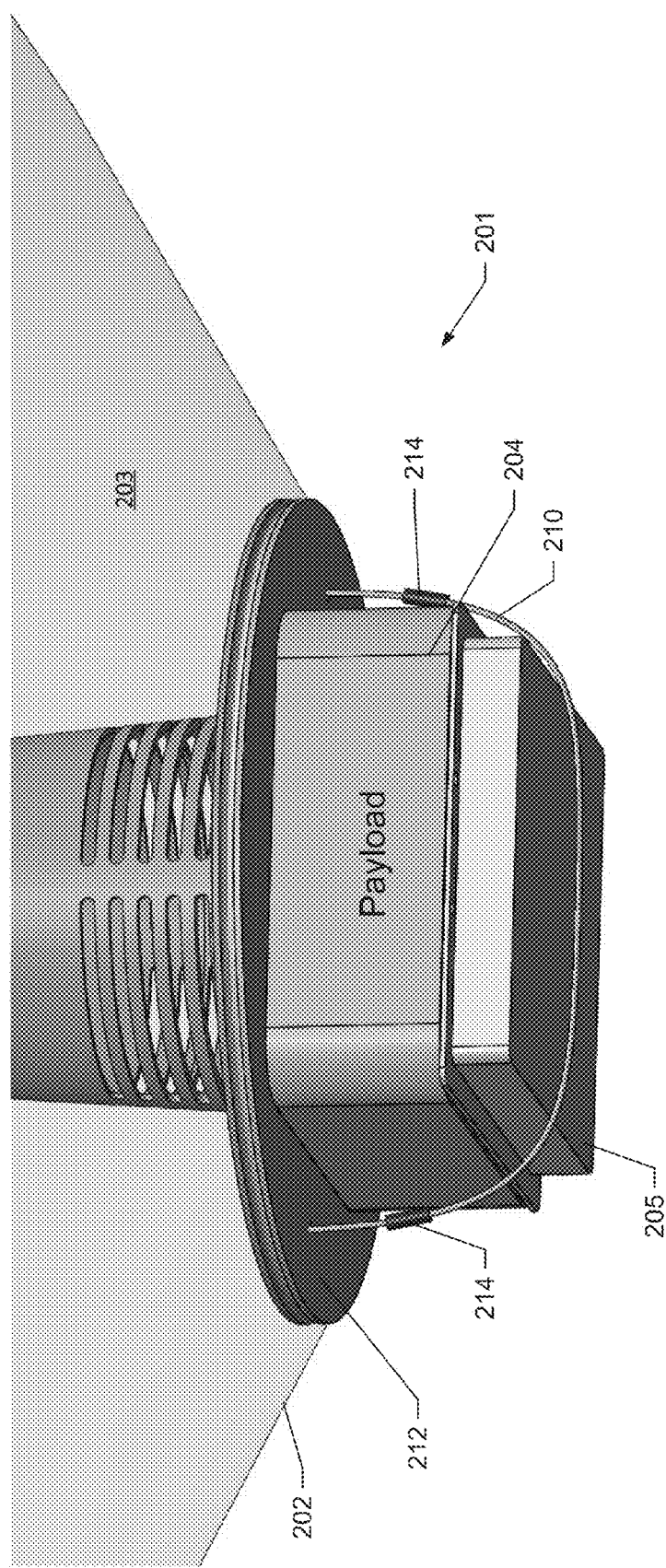
FIG. 2 illustrates an example payload separation assembly according to an example embodiment.

FIG. 2 illustrates an example embodiment of a payload separation assembly 201 according to an example embodiment. The balloon film 202 may be operably coupled to the sealing ring 212, such as by being tied by a cord, a ring clamp, fusing, or the like. The operable coupling of the balloon film 202 to the sealing ring 212 may be air tight or near air tight.

The payload 204 may be retained in a position in contact with the sealing ring 212 by the retention element 210. In an example embodiment, the retention element 210 may be one or more cables, such as a braided metal cable.

The release element 214 may be configured to release the retention element 210, thereby releasing the payload 204 from the sealing ring 212. In an example embodiment, the release element 214 may be a cable cutter, such as a pyrotechnic cable cutter, e.g. a squib. In an instance in which release element 214 is triggered, the release element 214 may cut the retention element 210, e.g. cable. In some example embodiments, the separation assembly 201 may include two or more release elements 214 per retention elements 210, to ensure that the payload 204 is released. In an instance in which the release element 214 is triggered, the payload 204 may fall away from the sealing ring 212 due to gravity, as the high altitude balloon 200 and sealing ring 212 ascend upward due to the change in buoyancy caused by releasing the payload 204.

Although, the example retention element 210 depicted is a cable, one of ordinary skill in the art would immediately appreciate other retention elements 210 may be substituted for the cable, such as an electromagnetic coupling, lock tabs, quarter turn cams, bolt and iris, or the like. Similarly, the release element 214 may also be substituted as appropriate relative to the retention element 210, such as an electric switch to deenergize or reverse the electromagnetic coupling, or a servo to operate the quarter turn cam or iris.

The release element 214 may be in wired or wireless communication with the payload 204. The release element 214 may be triggered by the payload 204, to release the retention elements 210, based on meeting predetermined condition or receiving a flight termination signal.

In an example embodiment, the payload 204 includes an antenna 205 configured to receive a flight termination signal from a remote source. The payload 204 may trigger the release elements 214, in response to receiving the termination of flight signal from the antenna 205. The termination of flight signal may be transmitted to the antenna 205 based on completion of a mission, elapsed time, geographic location, such as a sovereign nation's border, altitude, or the like.

In an example embodiment, the payload 204 may include an altimeter. The altimeter may be configured to measure the altitude of the payload 204. The payload 204 may trigger the release element 214, in an instance in which the altimeter measures a predetermined altitude, such as a predetermined payload drop altitude.

In an example embodiment, the payload 204 may include a position sensor, such as a portion of a positioning system, configured to determine the geographic position of high altitude balloon 200. The payload 204 may trigger the release elements 214, in an instance in which the position sensor determines the high altitude balloon 200 occupies a predetermined geographic position, such as 1 nautical mile from the border of Country Orange.

In an example embodiment, the payload 204 may include a timer configured to measure an elapsed time from an initiation event, such as launch of the high altitude balloon 200, a predetermined altitude, a geographic location, or the like. The payload 204 may trigger the release elements 214, in an instance in which the timer measures a predetermined elapsed time, such as 48 hours.

Figure 3:
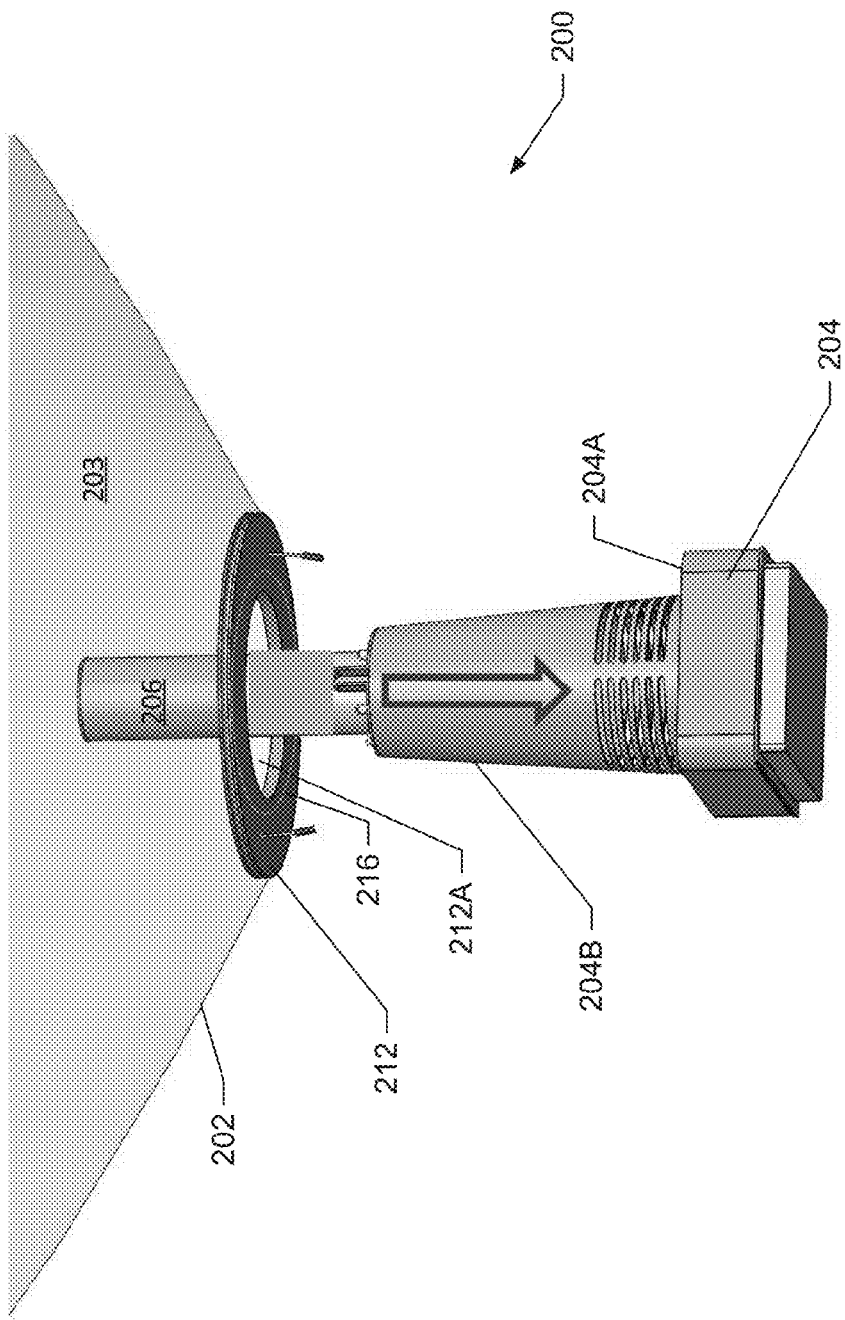
FIG. 3 illustrates an example high altitude balloon with the payload separated from the sealing ring according to an example embodiment.

In an example embodiment, at least a portion of the payload 204 may extend into the balloon film 202, through a payload aperture 212A, as discussed in FIG. 3. The portion of the payload 204 extending into the balloon film 202 may include a heating element 206, such as an electric heating coil, configured to transfer heat to the lifting gas 203. Additionally or alternatively, the heating element 206 may include the heat transfer element configured to transfer heat from the payload 204 to the lifting gas 203.

FIG. 3 depicts the high altitude balloon 200 with the payload 204 separated from the sealing ring 212. The sealing ring 212 may include the payload aperture 212A. The payload aperture 212A may be circular, or any other shape suitable to receive the payload 204. The shape of the payload aperture 212A may be selected to prevent the payload 204 from catching on the payload aperture 212A when released.

In an example embodiment in which the sealing ring 212 includes the payload aperture 212A, the contact between the payload 204 and sealing ring 212 may seal the lifting gas 203 within the balloon film 202. The seal between the payload 204 and sealing ring 212 may be air tight or near air tight. In some embodiments, the payload 204 and/or the sealing ring may include a flange ring to inhibit the lifting gas 203 from escaping the balloon film 202. In some example embodiments, a gasket 216 may be provided, disposed between the payload 204 and the sealing ring 212. The gasket 216 may be rubber, plastic, cloth coil, or the like configured to inhibit escape of the lifting gas 203 when the payload 204 is in contact with the sealing ring 212.

In some example embodiments, the portion of the payload 204 which extends into the balloon film 202 through the payload aperture 212A may be tapered, e.g. decreasing in diameter along the extension of the payload 204 into the balloon film. The payload 204 may have the smallest diameter at the point of the payload 204 furthest into the balloon film 202 and the widest diameter at the point of extension of the payload 204 closest to the payload aperture 212A. The taper of the portion of the payload 204 that extends into the balloon film 202, may reduce the risk of the payload 204 becoming caught or stuck when released from the high altitude balloon 200.

Release of the payload 204 from the sealing ring 212 may cause the payload aperture 212A to be exposed allowing for the lifting gas 203 to escape from the balloon film 202. The escape of the lifting gas 203 from the balloon film 202 may cause the high altitude balloon 200 to deflate and descend to the ground.

Figure 4:
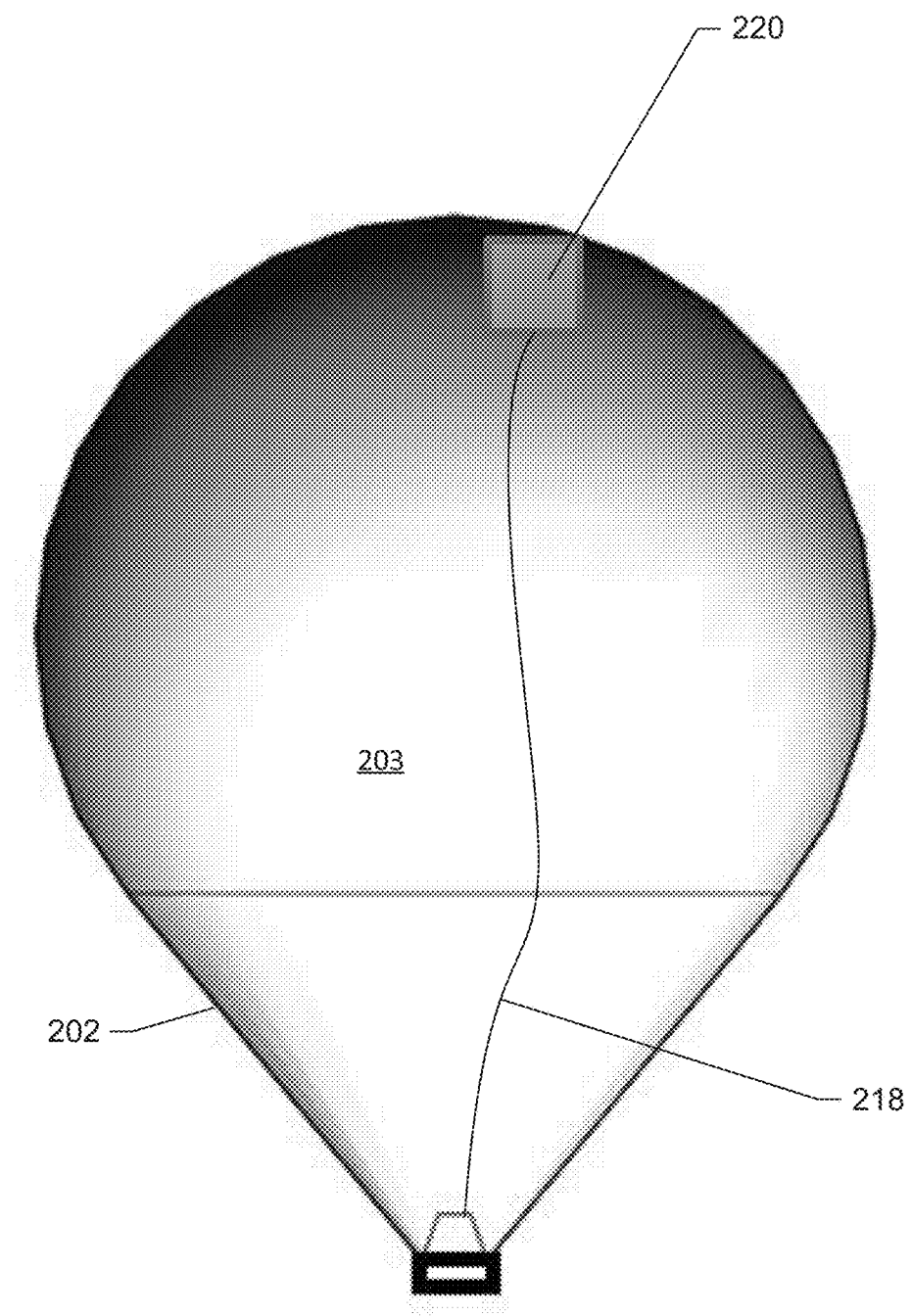
FIG. 4 illustrates an example high altitude balloon with a tear out patch and destruct tether according to an example embodiment.

FIG. 4 illustrates an example high altitude balloon with a tear out patch 220 and destruct tether 118 according to an example embodiment. In some example embodiments, it may be desirable to destroy or rapidly deflate the high altitude balloon 200 at termination of flight, such as for environmental concerns. In an example embodiment, the balloon film 202 may include the tear out patch 220. The tear out patch 220 may be disposed near the top of the balloon film 202. The tear out patch 220 may be configured to be removed to create a hole in the balloon film 202 to allow for the escape of the lifting gas 203.

In an example embodiment, a destruct tether 218 may be operably coupled between the tear out patch 220 and the payload 204. In an instance in which the payload 204 is released, the payload 204 may cause tension to be placed on the destruct tether 218, which in turn may cause tension on the tear out patch 220. The tension on the tear out patch 220, by the destruct tether 218, may cause the tear out patch 220 to decouple from the balloon film 202, creating a hole in the balloon film 202 allowing the lifting gas 203 to escape through the hole. The escape of the lifting gas 203 from the balloon film 202 may cause the high altitude balloon 200 to deflate and descend to the ground.

Example Payload

Figure 5:
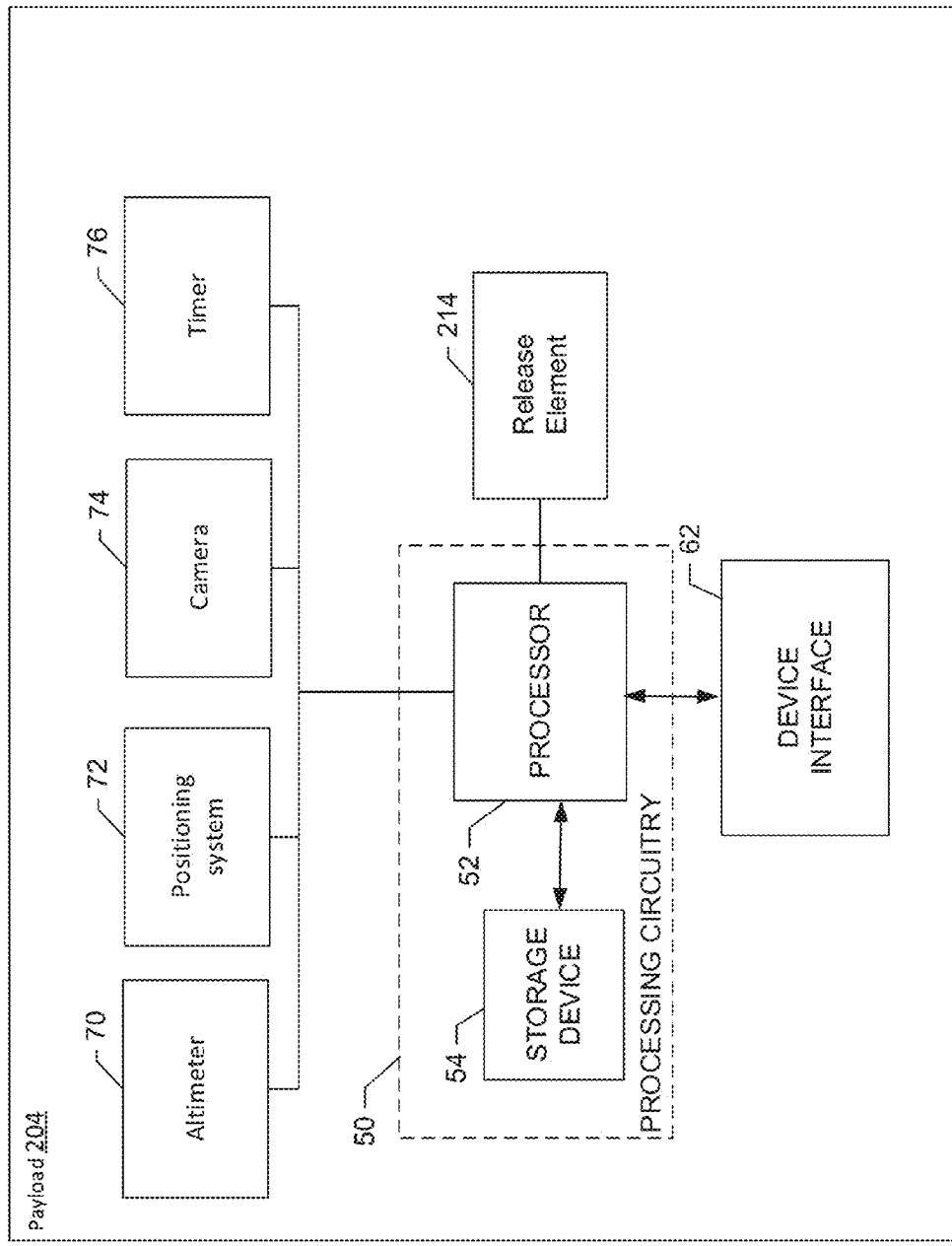
FIG. 5 illustrates elements of payload for a high altitude balloon according to an example embodiment.

FIG. 5 illustrates certain elements of payload for a high altitude balloon, such as high altitude balloon 200, according to an example embodiment. It should be noted that the elements described below may not be mandatory and thus some may be omitted in certain embodiments.

In an example embodiment, the payload 204 may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a device interface 62, altimeter 70, a positioning system 72, a camera 74, a timer 76, release elements 214, or the like. As such, the processing circuitry 50 may be embodied as a circuit chip (e.g., an integrated circuit chip) configured (e.g., with hardware, software or a combination of hardware and software) to perform operations described herein.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna, such as antenna 205 (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In some example embodiments, the communications network may be peer to peer, point to multipoint, a mesh network, or the like.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases that may store a variety of files, contents or data sets. Among the contents of the storage device 54, applications may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

The release elements 214 may be triggered by the processing circuitry 50, causing release of the payload 204 from the high altitude balloon, such as high altitude balloon 200. The release elements 214 may be substantially similar to the release elements 214 discussed above in reference to FIGS. 1-3.

The altimeter 70 may be configured to determine a current altitude of the payload 204. The altimeter 70 may be a pressure altimeter, sonic altimeter, radar altimeter, global positioning altimeter, or the like. The altimeter 70 may provide altitude data to the processing circuitry 50. The processing circuitry 50 may use the altitude data for various functions including, but not limited to, triggering of the release elements 214.

The positioning system 72 may be configured to determine a current geographical location of the payload 204. The positioning system 72 may include one or more position sensors, such as global position sensors. The positioning system 72 may provide position of location data to the processing circuitry 50 for various functions including, but not limited to, communication of the payload location to a remote receiver, triggering the release elements 214, or the like.

The camera 74 may be an analog or digital camera configured to capture one or more images. The captured images may be still images or video images, such as high altitude surveillance images. In some instances, the camera 74 may provide image data to the processing circuitry 50. In an example embodiment, the processing circuitry 50 may cause the image data to be stored in a memory, such as storage device 54 for later retrieval. In some example embodiments, the processing circuitry 50 may cause the image to be transmitted to a remote receiver, such as by using the device interface 62.

The timer 76 may be an analog or digital timer, configured to measure elapsed time from one or more initiation events, such as launch of the high altitude balloon, receipt of a signal, such as by the device interface 62, determination of a predetermined altitude or geographic position, or the like. The timer 76 may provide elapsed time data to the processing circuitry 50. The processing circuitry 50 may use the elapsed time data for various functions including, but not limed to, triggering the release elements 214.

In some embodiments, the high altitude balloon may be further configured for optional modifications. In this regard, for example, the retention element includes a cable. In some example embodiments, the release element includes a cable cutter and actuation of the cable cutter causes the cable to be cut, thereby releasing the payload from the high altitude balloon. In an example embodiment, the cable cutter is a pyrotechnic cable cutter. In some example embodiments, the release element includes at least two release elements. In an example embodiment, the sealing ring includes a payload aperture and at least a portion of the payload extends through the payload aperture into the balloon film. In some example embodiments, the payload aperture is substantially circular. In an example embodiment, the portion of the payload extending through the payload aperture decreases in diameter along an extension into the balloon film. The diameter of the portion of the payload extending through the payload aperture is smallest at a furthest point of from the payload aperture and largest at a closest point to the payload aperture In some example embodiments, the portion of the payload extending into through the payload aperture includes a heating element configured to transfer heat to the lifting gas. In an example embodiment, the contact between the payload and the sealing ring seals the payload aperture thereby inhibiting escape of the lifting gas from the balloon film. In some example embodiments, the high altitude balloon also includes a tear out patch operably coupled to the balloon film and configured to create a hole in the balloon film when removed and a destruct tether operably coupled to the payload at a first end of the destruct tether and to the tear out patch at a second end of the destruct tether. In an example embodiment, the release of the payload causes the destruct tether to tear out the tear out patch. In some example embodiments, the release element is triggered by the payload. In an example embodiment, the payload includes an antenna configured to receive a flight termination signal and the payload is configured to trigger the release element in response to the antenna receiving the flight termination signal. In some example embodiments, the payload includes an altimeter configured to measure an altitude of the high altitude balloon; and the payload is configured to trigger the release element in response to measuring a predetermined altitude. In an example embodiment, the payload includes a position sensor configured to determine a geographic position of the high altitude balloon and the payload is configured to trigger the release element in response to determining a predetermined geographic position. In some example embodiments, the payload includes a timer configured to measure the elapsed time from an initiation event and the payload is configured to trigger the release element in response to measuring a predetermined elapsed time. In an example embodiment, the high altitude balloon also includes a gasket disposed between the payload and the sealing ring configured to inhibit escape of the lifting gas from the balloon film when the payload is in contact with the sealing ring. In some example embodiments, the payload comprises a camera. In an example embodiment, the payload includes a radio transceiver or a positioning system.

Many modifications and other embodiments of the measuring device set forth herein will come to mind to one skilled in the art to which these inventions pertain having the benefit of the teachings presented in the foregoing descriptions and the associated drawings. Therefore, it is to be understood that the measuring devices are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A high altitude balloon comprising:
    a payload comprising an electronic device;
    a balloon film with lifting gas disposed within the balloon film;
    a sealing ring operably coupled to the balloon film;
    a retention element configured to retain the payload in contact with the sealing ring; and
    a release element configured to cause the retention element to release the payload; wherein the sealing ring comprises a payload aperture and at least a portion of the electronic device extends through the payload aperture into the balloon film.

2. The high altitude balloon of claim 1, wherein the retention element comprises a cable.

3. The high altitude balloon of claim 2, wherein the release element comprises a cable cutter, wherein actuation of the cable cutter causes the cable to be cut, thereby releasing the payload from the high altitude balloon.

4. The high altitude balloon of claim 3, wherein the cable cutter is a pyrotechnic cable cutter.

5. The high altitude balloon of claim 1, wherein the release element comprises at least two release elements.

6. The high altitude balloon of claim 1, wherein the payload aperture is substantially circular.

7. The high altitude balloon of claim 1, wherein the portion of the payload extending through the payload aperture decreases in diameter along an extension into the balloon film, the diameter of the portion of the payload extending through the payload aperture is smallest at a furthest point of from the payload aperture and largest at a closest point to the payload aperture.

8. The high altitude balloon of claim 1, wherein the portion of the payload extending into through the payload aperture comprises: a heating element configured to transfer heat to the lifting gas.

9. The high altitude balloon of claim 1, wherein the contact between the payload and the sealing ring seals the payload aperture thereby inhibiting escape of the lifting gas from the balloon film.

10. The high altitude balloon of claim 1, further comprising:
    a tear out patch operably coupled to the balloon film and configured to create a hole in the balloon film when removed; and a destruct tether operably coupled to the payload at a first end of the destruct tether and to the tear out patch at a second end of the destruct tether.

11. The high altitude balloon of claim 10, wherein the release of the payload causes the destruct tether to tear out the tear out patch.

12. The high altitude balloon of claim 1, wherein the release element is triggered by the payload.

13. The high altitude balloon of claim 1, wherein the payload comprises: an antenna configured to receive a flight termination signal; and wherein the payload is configured to trigger the release element in response to the antenna receiving the flight termination signal.

14. The high altitude balloon of claim 1, wherein the payload comprises: an altimeter configured to measure an altitude of the high altitude balloon; and wherein the payload is configured to trigger the release element in response to measuring a predetermined altitude.

15. The high altitude balloon of claim 1, wherein the payload comprises: a position sensor configured to determine a geographic position of the high altitude balloon; and wherein the payload is configured to trigger the release element in response to determining a predetermined geographic position.

16. The high altitude balloon of claim 1, wherein the payload comprises: a timer configured to measure elapsed time from an initiation event; and wherein the payload is configured to trigger the release element in response to measuring a predetermined elapsed time.

17. The high altitude balloon of claim 1, further comprising:
a gasket disposed between the payload and the sealing ring configured to inhibit escape of the lifting gas from the balloon film while the payload is in contact with the sealing ring.

18. The high altitude balloon of claim 1, wherein the payload comprises a camera.

19. The high altitude balloon of claim 1, wherein the payload comprises a radio transceiver or a positioning system.

20. The high altitude balloon of claim 1, wherein the portion of the electronic device that extends through the payload aperture into the balloon film includes an electric heating coil.

* * * * *